United States Patent Office 3,002,645
Patented Oct. 3, 1961

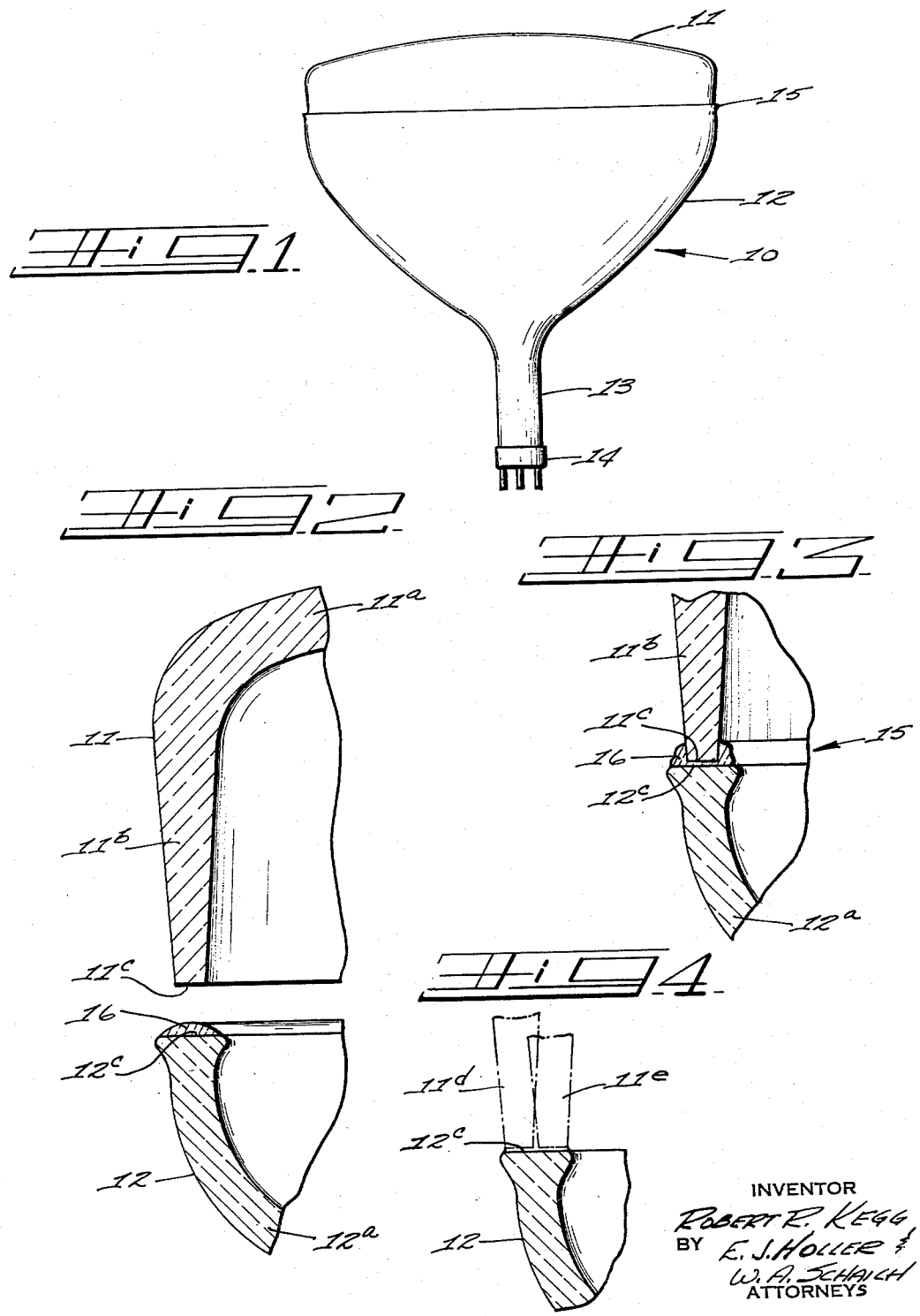

3,002,645
HERMETIC JOINT FOR GLASS CATHODE-RAY TUBE ENVELOPE
Robert R. Kegg, Toledo, Ohio, assignor to Kimble Glass Company, a corporation of Ohio
Filed Aug. 8, 1957, Ser. No. 676,977
3 Claims. (Cl. 220—2.1)

The present invention relates to an improved joint for uniting prefabricated hollow glass parts to form an evacuated envelope such as a cathode-ray picture tube envelope.

In the manufacture of evacuated glass envelopes such as electronic tubes containing heat sensitive elements which may be easily damaged, the problem of joining preformed glass parts in extremely precise alignment cannot be conveniently accomplished by direct fusion of the glass. This is particularly true in the case of manufacturing television picture tubes adaptable for use in the reception of colored television images. Heretofore, it has been proposed that the atmospheric pressure on the glass parts of an evacuated envelope be utilized to maintain a sealed joint between the parts. However, the primary difficulty in this method of sealing has been the requirement that the complemental sealing surfaces of the two glass parts be subjected to extensive grinding and polishing operations to produce a so-called optical quality surface. Such surface preparation has resulted in an impractical and inefficient cost of manufacture.

A joint such as commonly employed in monochromatic television picture tubes in which the parts are joined by thermal fusion at their sealing edges is not practicable in the case of polychromatic television for the reasons set forth above. Any application of elevated temperatures causes a distortion of the glass parts as well as either complete destruction or dimensional deformation of electronic elements of the tube. In present-day manufacturing of color TV tubes the viewing portion and funnel portion of the tubes must be capable of joinder subsequent to the insertion of the large color producing element adjacent the viewing area of the tube. Examples of such elements are a shadow mask having a great number of small openings or a color control grid having a plurality of uniformly spaced parallel strands. One of these elements is interiorly mounted within the face plate portion of the envelope in extremely precise alignment with one or more beam guns at the vortex end of the tube funnel. This color-controlling element requires extremely accurate placement in the tube.

Accordingly, it is an object of this invention to provide a vacuum-tight glass envelope comprised of a plurality of preformed hollow glass parts having complementary sealing surfaces, only one of which need be polished to a lesser degree than an optical finish, for sealing at relatively low temperatures during fabrication of the envelope.

It is an object of this invention to provide a vacuum-tight glass envelope comprised of a plurality of preformed hollow glass parts having complementary sealing surfaces, one of which is considerably wider than the other, which envelope may be hermetically sealed at relatively low temperatures during fabrication of the envelope.

Another object of this invention is to provide a separable glass envelope for a cathode-ray tube which is maintained in hermetically sealed assembled relationship by an interposed low-melting sealant, the sealed area being readily adaptable to adjustable alignment of at least one of the parts with working elements of the tube.

Another object of this invention is to provide an envelope for a cathode-ray tube which is strengthened by an annular rib of the glass in the sealed area which is readily adaptable to precise alignment of working elements of the tube.

Still another object of this invention is to provide a large hollow component member for a glass cathode-ray tube envelope comprising a frusto-conical shaped funnel having a wide planar open edge adaptable to durably sealing to a face plate part having a narrower sealing edge at temperatures which avoid stresses and distortion of the parts on thermal sealing.

The specific nature of this invention, as well as other objects and advantages thereof, will become apparent to those skilled in the art from the following detailed description, taken in conjunction with the annexed sheet of drawings on which, by way of preferred example only, are illustrated the preferred embodiments of this invention.

On the accompanying drawings:

FIG. 1 is an elevational view of a cathode-ray tube embodying the principles of the present invention.

FIG. 2 is an enlarged vertical sectional view of a portion of FIG. 1 showing the sealing area of the parts in disassembled relationship.

FIG. 3 is a view similar to FIG. 2 showing the parts in sealed relationship.

FIG. 4 is a part sectional view showing the adjustable sealing relationship of the parts.

While this invention will be described as specifically applied to the manufacture of a cathode-ray tube, it will be apparent to those skilled in the art that the principles of the invention are equally applicable to the manufacture of any type of evacuated glass envelope formed by assembly of two or more preformed hollow glass parts. Assembly of the tube in accordance with this invention is capable of accomplishment without the use of any metallic members in the seal area as frequently practiced in this art. Furthermore, the seal may be effected without an optical polish being applied to the sealing surfaces, although at least one of the surfaces is given a commercial polish to approximate a planar condition.

A preferred embodiment consists of a cathode-ray tube envelope 10, consisting of a glass face plate 11, glass funnel 12 and neck tubulation 13 which is closed at its extremity by at least one beam gun 14. Face plate 11 consists of a curved viewing panel 11a bounded by a depending integral peripheral flange 11b which terminates at an annular sealing surface 11c. The internal surface of the viewing panel 11a is normally coated with a layer of one or more phosphor materials which may be varied widely as known in the art. However, the characteristics of the particular phosphors and the structural elements within the tube capable of furnishing a viewable image are not an essential part of this invention in view of their wide modification in the electronic field.

Funnel 12 has generally frusto-conical shaped sidewalls 12a and an annular sealing surface 12c at its large end. Funnel sealing surface 12c has a complemental contour to face plate sealing surface 11c. The side walls 12a of the funnel are generally of relatively uniform thickness toward its large open end in accordance with conventional practice in forming such glass article. In the present invention this particular area is strengthened by the sealing surface 12c being formed wider than complemental sealing surface 11c.

The overall shape of the glass parts may be circular or rectangular as known in the art with sealing surfaces 11c and 12c being relatively planar. Sealing surfaces 11c and 12c may be prepared in any known manner in the molding of the parts or by subsequent shaping to provide at least one reasonably planar surface. However, extensive grinding or polishing of the surfaces to anything near an optical quality finish is not necessary in practicing this invention. A commercial grind applied to sealing surface 12c may be conveniently employed in a preferred mode of the present invention. Sealing surface 12c is formed either in the initial molding of funnel 12 or is reshaped to a considerably greater width than its opposite sealing surface 11c. The difference in width of the sealing surfaces 11c and 12c furnishes considerable latitude in lateral positioning of the parts to achieve an accurate alignment of beam guns and color-control structure with electron-excited phosphors deposited on the viewing panel.

As is well known in the art, the conventional phosphor layers of various types which are employed within cathode-ray tubes and other internal electronic elements thereof such as the beam gun 14 are frequently readily subject to heat damage at elevated temperatures. Hence, it is extremely desirable to effect the sealing of a face plate and funnel portions of the tube at temperatures that are not in excess of those employed in conventional bake-out operations which are required for all or part of the internal electronic components.

In color television it is frequently an additional requirement that the face plate and funnel portions of the tube be readily separable to permit adjustment and alignment of relatively large internal elements such as the aperture mask or line grid. It is further requirement that the seal area be adaptable to sealing techniques which are capable of being consummated as a final operation in the tube making process with the working elements of the tube finally installed in desired alignment. These requirements represent further disadvantages of sealing techniques previously employed which have embodied thermal fusion of at least a portion of the glass parts.

The sealing composition 16 which may be utilized as the sealant between the parts is preferably comprised of a low-melting glass-to-glass sealant either of a vitreous or devitrifiable nature. The sealing composition may be one having a low-melting temperature of the order of about 400° to 450° C. such as various compositions of modified lead borate. The sealant may also be composed of a devitrifiable sealing composition such as set forth in the co-pending patent application of Billian and Hagedorn, Serial No. 658,015, filed May 9, 1957 assigned to the same parent assignee as the present application. The compositions have fiber softening point temperatures in the range of from 330° to 400° C. and a thermal expansion coefficient (0°–350° C.) in the range of from about $80$–$120 \times 10^{-7}$ cm. per cm. per degree C. Each of the compositions has a relatively broad devitrification range which as described above has not been found to be detrimental but actually advantageous. The sealing compositions have the outstanding feature of being able to form a composite glass article from individual parts having a tolerable stress limit at the sealing area of 500 p.s.i. maximum. Any stress which may be established within an interposed layer of devitrified composition is minor and not objectionable because of its being relatively thin. The source of rupturable sealing stresses is thereby eliminated in the glass parts.

In order to establish the joint 15 between the glass parts as indicated on FIGS. 1 and 3, a thin band or layer 16 of low-melting sealing composition is deposited continuously upon at least one of the sealing surfaces 11c or 12c. As illustrated on FIG. 2, the sealing layer 16 is shown on commercially polished surface 12c in sealing condition preliminary to sealing. The sealing composition may be heat softened by a localized application of heat to near its softening or melting point temperature prior to the parts being brought into juxtaposed contact in proper alignment. The sealing temperature of the sealant may be of the order of 375° to 425° C. at the time of sealing, but in any event is below 450° C. The parts are brought into the sealing arrangement shown in FIG. 3 with the sealing layer 16 covering both sealing surfaces 11c and 12c. Sealing surface 11c of lesser width has its edges surrounded by the sealing composition which extends to the approximate limits of sealing surface 12c. By utilizing an amount of sealing composition similar to the sealing condition shown on FIG. 3, the joint may be effected without re-entrant angles being formed in the seal area. The presence of re-entrant angles tend to produce a localized condition more readily subject to breakage either upon physical or thermal shock than one having no inwardly directed checks or angles.

The wider sealing surface 12c facilitates lateral adjustment and positioning of the face plate member with respect to the funnel member so that the tube axis may be shifted slightly within limits to attain the desired precise alignment between the parts. The wider surface 12c being of greater cross-section also serves to strengthen the joint as an annular strengthening rib to make the tube more resistant to fracture at the seal area.

On FIG. 4 the lateral shifting of the sealing edge of the face plate is shown by flanges 11d and 11e on FIG. 4 which permits lateral movement of sealing surface 11c on surface 12c still remaining within the limits of sealing surface 12c.

Either one or both the sealing surfaces 11c and 12c may be coated with the sealing composition. The seal, when effected as shown on FIG. 3, produces a joint able to withstand the excessive pressures created by evacuation of large size cathode-ray tubes. Cross-sectional examination of the joint has shown that the sealing composition has an extremely small number of voids when prepared in preferred form and a strength of the order of the parent glass parts themselves.

It is, of course, to be understood that the forms of the invention herewith shown and described are merely illustrative of preferred embodiments and that such changes may be made therein as fall within the preview of one skilled in the art and the scope of the appended claims.

I claim:

1. A sealed envelope for a cathode-ray picture tube adapted to color television reception comprising at least two hollow glass parts consisting of a funnel-shaped body portion and a concavo-convex face plate portion, said funnel and face plate portions having sidewalls terminating in complemental annular essentially planar unpolished sealing surfaces disposed in juxtaposed relation, and an annular layer of solidified low-melting glass sealing composition interposed between the said sealing surfaces, one of said sealing surfaces having a substantially greater width than the thickness of its adjacent side wall area as well as the juxtaposed other sealing surface to facilitate lateral adjustment of said sealing surfaces with respect to each other during sealing, said annular layer of sealing composition being in at least partially devitrified form and extending over the major portions of the opposing sealing surfaces and adjacent side wall areas of the narrower sealing surface, the sealed region being essentially devoid of re-entrant angles.

2. A sealed envelope for a cathode-ray picture tube adapted to color television reception comprising at least two hollow glass parts consisting of a funnel-shaped body portion and a concavo-convex face plate portion, said funnel and face plate portions having sidewalls terminating in complemental annular essentially planar unpolished sealing surfaces disposed in juxtaposed relation, and an annular layer of solidified low-melting glass sealing composition interposed between the said sealing surfaces, the sealing surface of the said funnel portion being substantially wider than the thickness of its adjacent sidewall area and the juxtaposed sealing surface of said face plate portion to facilitate lateral adjustment of said sealing surfaces with respect to each other during sealing, said annular layer of sealing composition being in at least partially devitrified form and extending over the major portions of the opposing sealing surfaces and adjacent sidewall areas of the narrower sealing surface, the sealed region being essentially devoid of re-entrant angles, said sealing composition having an initial softening point temperature less than about 450° C.

3. The method of fabricating a sealed envelope for a cathode-ray picture tube adapted to color television reception comprising the steps of separately forming at least two hollow glass parts consisting of a funnel-shaped body portion and a concavo-convex face plate portion, said funnel and face plate portions being formed with sidewalls terminating at complemental annular essentially planar unpolished sealing surfaces; forming at least one of said sealing surfaces having a substantially greater width than its adjacent sidewall and the other sealing surface, interposing a continuous annular layer of a low-melting sealing composition between the said sealing surfaces, heat-softening the said sealing composition into thermoplastic condition, laterally adjusting the said funnel and face plate portions into final alignment with respect to each other, and solidifying and cooling the said sealing composition to bond hermetically the said sealing surfaces.

References Cited in the file of this patent

UNITED STATES PATENTS

| | | |
|---|---|---|
| 2,504,504 | Despois | Apr. 18, 1950 |
| 2,643,020 | Dalton | June 23, 1953 |
| 2,889,952 | Claypoole | June 9, 1959 |

FOREIGN PATENTS

| | | |
|---|---|---|
| 724,290 | Great Britain | Feb. 16, 1955 |

Dedication 3,002,645.—*Robert R. Kegg*, Toledo, Ohio. HERMETIC JOINT FOR GLASS CATHODE-RAY TUBE ENVELOPE. Patent dated Oct. 3, 1961. Dedication filed Sept. 12, 1962, by the assignee, *Owens-Illinois Glass Company*.

Hereby dedicates to the public of the United States the full term of said patent.

[*Official Gazette November 6, 1962.*]